(No Model.)
H. W. WINTER.
METHOD OF MAKING ROTARY TOOTHED CUTTERS.
No. 501,555. Patented July 18, 1893.
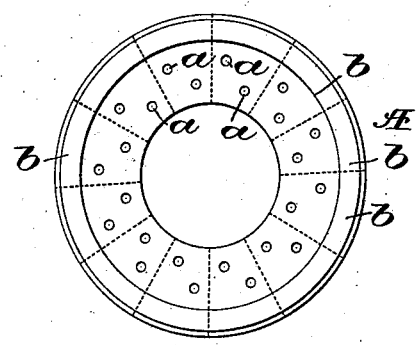
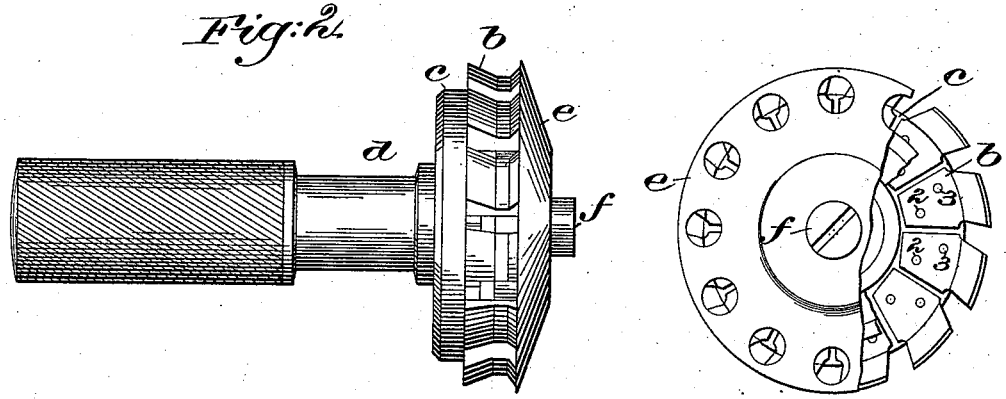
Witnesses.
Fred S. Greenleaf
Louis N. Gowell
Inventor
Henry W. Winter
by Crosby & Gregory Attys.

UNITED STATES PATENT OFFICE.

HENRY W. WINTER, OF BOSTON, ASSIGNOR TO JAMES W. BROOKS, TRUSTEE, OF PETERSHAM, MASSACHUSETTS.

METHOD OF MAKING ROTARY TOOTHED CUTTERS.

SPECIFICATION forming part of Letters Patent No. 501,555, dated July 18, 1893.

Application filed March 13, 1893. Serial No. 465,763. (No model.)

*To all whom it may concern:*

Be it known that I, HENRY W. WINTER, of Boston, county of Suffolk, State of Massachusetts, have invented an Improvement in Methods of Making Rotary Toothed Cutters, of which the following description, in connection with the accompanying drawings, is a specification, like letters and figures on the drawings representing like parts.

The cutter herein to be described is particularly adapted for trimming leather and like substances, and may be employed in sole trimming machines, and in other machines.

Figure 1 shows a metal ring from which to make the teeth of the cutter. Fig. 2 shows in side elevation the completed cutter on its shaft, and Fig. 3 is a face or right hand end view of the cutter shown in Fig. 2, but with part of the rand guide broken away.

In accordance with my invention, I take a metal ring A, the periphery of which has been turned to give to it the contour in cross section desired for the teeth, the particular shape so given to the periphery of the ring depending upon the shape it is desired to give to the edge of the piece of leather or other material to be trimmed or cut. This ring is thereafter by a jig and drills provided with a series of holes $a$, $a$, herein shown as twenty-four in number, and at exactly the proper distance apart. After this, the ring is cut radially on the dotted lines into a series of segments, thus making teeth $b$, $b$, each segment having, as herein shown, two holes $a$, $a$. The sawing of the ring into segments makes teeth, but said teeth would not cut if their convexed outer ends were left in the circle occupied by the periphery of the ring, and to make the teeth cut, each convexed end must be set eccentric to the center of the ring before it was cut. Locating the holes $a$, $a$, in the ring by a jig before the ring is cut into teeth, adapts each tooth to be readily fitted over a series of pins 2, 3, extended from a disk $c$ adapted to be fastened onto the shaft $d$, and in practice said pins will be so set that when the teeth are applied to them the convexed outer edges of the teeth will each be eccentric to the center of rotation of the shaft $d$, such location of the teeth forming a cutting edge with clearance back of it.

The drawing Fig. 3, shows the convexed working exterior of each tooth as eccentric to the center of rotation of the cutter, so that the leading corner or cutting edge of each tooth projects a little beyond the rear end of the tooth next in advance of it in the direction of rotation of the cutter.

By my method a very superior cutter, one of great accuracy, may be cheaply made, a cutter in which the extent of the cut is exactly the same at any and every tooth, and the teeth may be made exactly alike, so that a broken tooth may be readily replaced by a perfect one. When the holes 2, 3, are made in the separate teeth it is almost impossible to get two teeth with just the same amount of clearance, but by drilling the holes in the ring by a jig before the latter is cut into teeth, the extent of the eccentricity of the teeth in the cutter may be determined with the greatest accuracy in advance.

In the drawings $e$ is the rand guide connected to the shaft $d$ by a screw $f$ in usual manner.

Having described my invention, what I claim as new, and desire to secure by Letters Patent, is—

The herein described method of producing rotary toothed cutters, which consists, first, in making the peripheral contour of a metallic ring to accord in cross section with the shape of the edge to be trimmed; second, jigging or drilling multiple concentric series of holes $a$, in said ring; and third, separating the ring segmentally into teeth, each segment containing at least two of said holes, substantially as described.

In testimony whereof I have signed my name to this specification in the presence of two subscribing witnesses.

HENRY W. WINTER.

Witnesses:
GEO. W. HAMMATT,
FRANK CHASE.